Feb. 8, 1966 L. D. BRAITBERG 3,234,075
METHODS FOR CONTROLLING SLIMES IN AQUEOUS MEDIA WITH A
CATIONIC COLLOIDAL ALUMINA IN FIBROUS FORM
Filed Jan. 10, 1963

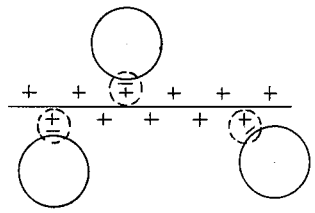

FIG.1.

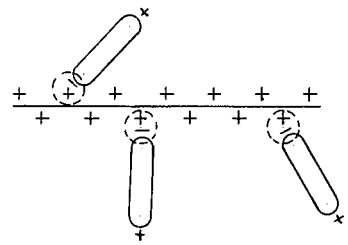

FIG.3.

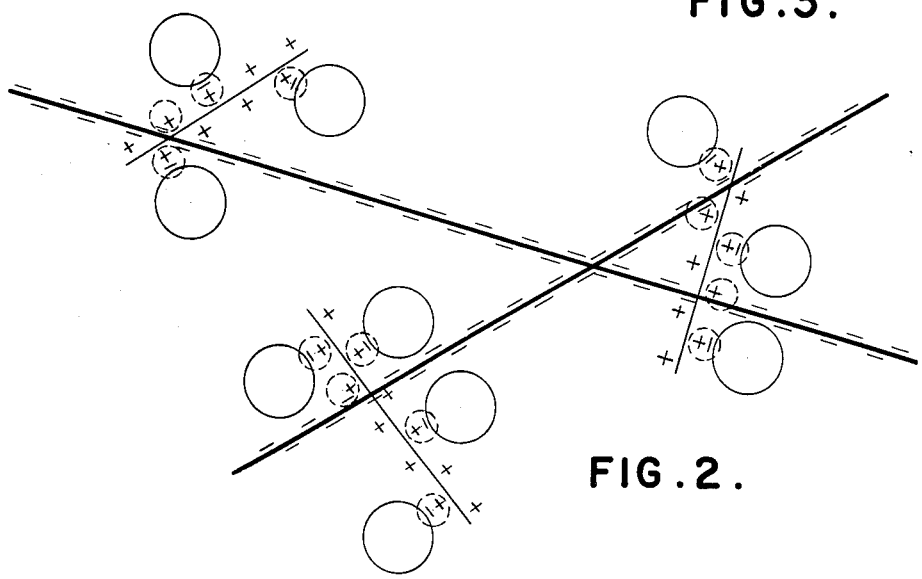

FIG.2.

LEGEND

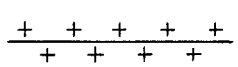 ELONGATED CATIONIC MACRO-MOLECULE OF FIBROUS COLLOIDAL ALUMINA MONOHYDRATE

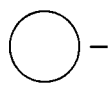 PITCH PARTICLE, ANIONIC BECAUSE OF ROSIN AND/OR FATTY ACID CARBOXYL GROUPS

 PULP FIBER

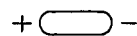 MICROORGANISM (ZWITTER ION)

 REACTION BOND

INVENTOR
Leo D. Braitberg

BY Arnold & Roylance
ATTORNEYS

3,234,075
METHODS FOR CONTROLLING SLIMES IN AQUEOUS MEDIA WITH A CATIONIC COLLOIDAL ALUMINA IN FIBROUS FORM
Leo D. Braitberg, Park Forest, Ill., assignor to United States Movidyn Corporation, Chicago, Ill., a corporation of Illinois
Filed Jan. 10, 1963, Ser. No. 250,523
6 Claims. (Cl. 162—161)

The present invention relates to the treatment of aqueous media to combat the effects of slime-forming materials containing anionic components. Though useful in the treatment of aqueous media of many types, the invention has particular advantages in the treatment of the recirculating waters of pulp and paper mills.

In industries such as the pulp and paper industry, early prior-art workers considered slimes to be always of microbiological origin, that is, as arising from bacteria, fungi or algae. More recently, it has been recognized that slimes that were originally thought to be of biological origin are frequently chemical in nature, and this has explained why many slimes have failed to respond to treatment with microbicides. It has also now been determined that some slimes are the result of both chemical and biological action, commencing initially as chemical precipitates, for example, with precipitates fostering biological growths.

For the purpose of the present specification, and in line with the more recent discoveries of the nature of slimes, slime is defined as any objectionable deposit, whether biological or chemical in nature or arising from both biological and chemical phenomena, which occurs in aqueous media in such manner as to materially impair the usefulness of the aqueous media. The invention is primarily concerned with the control of slimes which arise from slime-formers which contain significant amounts of anionic components. Thus, the invention combats the microorganisms since, being in the nature of Zwitter ions, microorganisms are effectively anionic. Similarly, the invention is successful in the control of all chemical slime-formers which contain significant amounts of anionic materials, such chemical slime-formers particularly including pitch in the waters of pulp and paper mills; clays; fillers; pigments; gums; and starches, for example.

The present invention provides an improved method and compositions for controlling slimes in aqueous media and is characterized by the novel and particularly advantageous ability to control by a simple treatment all slime-formers containing significant amounts of anionic components, regardless of whether the slime-formers are biological or chemical in nature.

The invention provides an especially effective method and compositions for the control of slimes generally, and pitch particularly, in the recirculating waters of pulp and paper mills.

The invention further provides a particularly effective method for controlling slimes in swimming pool waters, and in industrial waters, whether in stagnant pools or circulating systems.

The invention is based on the discovery that slime-formers which contain significant amounts of anionic components can be controlled by treatment with a single agent effective to flocculate the slime-former in such manner that the floc can be easily removed from the aqueous medium being treated, and that such treatment is successful whether the slime-former is biological or chemical in nature.

The invention is of special significance in connection with treatment of the recirculating waters of pulp and paper mills. In the pulp and paper industry, use of many of the known slime-preventatives, such as phenyl mercuric acetate, has been largely discontinued because of their possibly dangerous character, and other less effective agents have been substituted in efforts to control biological slime-formers. Further, no truly dependable and effective way heretofore was available to control that type of slime generally classified as pitch. In fact, one of the common approaches to control of pitch problems in pulp and paper mill waters has been the use of alum, an additive which tends to precipitate the pitch in sticky agglomerated form or as a gelatinous precipitate, both types of precipitates frequently constituting a more troublesome slime than the original pitch itself.

I have discovered that, by adding to the aqueous media to be treated a cationic colloidal fibrous alumina in macro-molecular form, with the macro-molecules 100–1500 millimicrons in length and having a length-to-width ratio of at least 20:1, all slime-formers containing anionic constituents, including microorganisms, pitch and other constituents recognized as chemical slime-formers, can be flocculated in such manner that the resulting floc is unobjectionable and can easily be removed from the aqueous medium. In the case of recirculating waters in pulp and paper mills, the floc attaches to the pulp fibers and is removed therewith, as during formation of the paper, for example. Where the invention is employed to control slimes in swimming pool waters, the floc is removed by the usual filter. In the case of stagnant pools, the floc is decanted over a weir or the like, and removed by settling.

The particular alumina employed in accordance with the invention is characterized by elongated macro-molecules with a multiplicity of positive charges distributed along the molecule. The requirements of the invention are satisfied, for example, by naturally occurring fibrous boehmite and by synthetically produced fibrous colloidal alumina monohydrates, so long as the material is cationic, characterized by macro-molecules which are 100–1500 millimicrons in length and have a length-to-width ratio of at least 20:1 with the positive charges distributed linearly, and forms a colloidal solution in aqueous media. Advantageously, the invention can be practiced with fibrous alumina monohydrate produced in the manner described in U.S. Patent 2,915,475, issued December 1, 1959, to John Bugosh, and, for convenience, the additive will be referred to hereinafter as "fibrous alumina monohydrate."

In accordance with the invention, depending upon the particular aqueous medium to be treated, the fibrous alumina monohydrate can be metered continuously or periodically into the aqueous medium, using the fibrous alumina monohydrate either in pure solid form, or in admixture with a suitable extender or extenders, or in the form of a pumpable colloidal solution, or in the form of a gel. The relative proportion of fibrous alumina monohydrate employed depends both on the character and environment of the aqueous medium being treated and on the nature and concentration of the slime formers present therein. Since fibrous colloidal alumina monohydrates having the aforementioned characteristics are capable of flocculating anionic materials in amounts up to hundreds of times the weight of fibrous alumina monohydrate employed, the fibrous alumina monohydrate is introduced to the aqueous medium in relatively minute quantities, ranging from 0.01 part per million to 150 parts per million, based on the aqueous medium being treated.

When the invention is to be practiced to remove slime formers from a body of water, such as a pool not subject to recirculation, so as to achieve clarification, the fibrous alumina monohydrate is simply added in an amount providing a concentration thereof equal to 0.1–15.0 parts per million, and the resulting floc simply decanted and allowed to settle.

In the case of control of slimes in paper and pulp mill waters, for instance, it is convenient to base the proportion of the fibrous alumina monohydrate on the solids content of the water being treated. Thus, paper and pulp mill waters can be effectively treated with the fibrous alumina monohydrate in amounts equal to from 0.001 lb. to 0.5 lb. per ton of pulp solids contained in the water, the narrower range of from 0.01 lb. to 0.2 lb. per ton of pulp solids being most advantageous.

Unlike prior-art practices, the method of this invention controls slimes, whether from microorganisms, pitch or other chemical slime-formers, by effectively removing the slime-formers from the aqueous system being treated. The fibrous alumina monohydrate remains in stable colloidal solution in the aqueous medium until the slime-forming material, containing anionic constituents, is encountered. Then, whether the slime-former is of biological origin, or chemical in nature, it reacts with the fibrous alumina monohydrate macro-molecules to form a floc which is in the nature of an independent moiety having no material tendency to be sticky or form agglomerates.

The mode of reaction which characterizes the fibrous alumina monohydrate is typified by the manner in which that additive flocculates pitch in the recirculating waters of paper and pulp mills. In such waters, the pitch particles comprise rosin and fatty acids, plus major proportions of effectively neutral substances such as hydrocarbons, waxes, alcohols, ketones and aldehydes. Despite the complex nature of the pitch particle, the carboxyl groups presented by the acid constituents provide an effective "handle" for removal of the entire particle from the aqueous medium. Thus, with the fibrous alumina monohydrate macro-molecules dispersed through the aqueous medium, the anionic carboxyl groups of the acid pitch constituents react with positive charges spaced along the fibrous macro-molecule of the alumina monohydrate, so that a plurality of carboxyl groups are attached to each macro-molecule of the alumina monohydrate, in the manner illustrated diagrammatically in FIG. 1 of the accompanying drawings. Flocculation results, the floc consisting of fibrous alumina monohydrate macro-molecules each loaded with attached pitch particles.

Though the fibrous alumina monohydrate macro-molecules may each be attached to a plurality of pitch particles, flocculation occurs before all of the positive charges of the alumina monohydrate macro-molecules have been satisfied. Accordingly, even in the floc, the fibrous alumina monohydrate macro-molecules remain distinctly cationic and reactive. Hence, when the floc comes into contact with negatively charged pulp fibers, each fibrous alumina monohydrate macro-molecule still presents numerous reactive positive charges via which the alumina monohydrate macro-molecule is attached to a plurality of the pulp fibers. As a result, the fibrous alumina monohydrate macro-molecules in the floc are effectively cross-linked by pulp fibers, in the manner illustrated diagrammatically in FIG. 2, and the floc is accordingly removed from the water with the pulp fibers as the latter are formed into the paper web.

As seen in FIG. 3, microorganisms, acting as Zwitter ions, are reactively coupled to the fibrous alumina monohydrate macro-molecules in the same fashion as the pitch particles dealt with in FIGS. 1 and 2. Though, in the drawings and the explanation just above, the slime-forming materials have been taken to be pitch and microorganisms, the mode of operation of the invention is generally the same when employed to control other slimes arising from slime-formers containing anionic constituents. In all cases, the elongated fibrous alumina monohydrate macro-molecules each react with a plurality of slime-forming anions, in the same fashion exemplified by FIG. 1, to produce a floc which is neither sticky nor gelatinous and which can easily be removed from the aqueous medium being treated.

It is most advantageous to employ the fibrous alumina monohydrate in the form of an aqueous solution of predetermined concentration, for ease of proper introduction into the aqueous medium in which slime is to be controlled. If the alumina monohydrate is simply dispersed in water, there is a tendency for the solution to be unstable during storage, becoming progressively more thixotropic until unsuitable for handling by the usual metering pumps. To avoid this difficulty, I employ in the aqueous solution 0.1–1.5% by weight of a nonionic surface active agent or agents. When aqueous solutions are thus prepared containing up to 8% by weight of the fibrous alumina, the nonionic surface active agent renders the solution thin and easily pumpable and maintains that condition over long storage periods.

Where desirable, the alumina monohydrate can be employed in colloidal solution in a non-aqueous solvent which is compatible with the aqueous medium to be treated. In such cases, strongly polar organic solvents can be employed, particularly including propylene glycol, ethylene glycol, glycerol, and dimethyl formamide. Concentrated aqueous solutions of the alumina monohydrate can be dispersed in polar organic solvents, particularly including amyl alcohol, butanol, and the lower alkanols generally.

Instead of employing the fibrous alumina monohydrate in the form of a solution, a gel can be used, the gel simply being scooped into the aqueous media to be treated, or being dispersed in water before addition. The gels are prepared simply by dispersing relatively large proportions of the alumina monohydrate in water, or an organic solvent, the lower limit being about 10% by weight of the alumina monohydrate. Employing such relatively large proportions of the alumina monohydrate, use of special mixing equipment affording a mulling or kneading action is desirable.

As discussed in detail hereinafter, the fibrous alumina monohydrate is particularly effective when employed in conjunction with other liquid and solid additives, and compositions in accordance with the invention may include both the alumina monohydrate and at least one active additive or ingredient for the aqueous medium to be treated.

The following example illustrates preparation of an aqueous solution of fibrous alumina monohydrate in accordance with the invention.

*Example 1*

The fibrous alumina monohydrate employed is prepared in accordance with the aforementioned U.S. Patent 2,915,475 by controlled heating of an aqueous suspension of alumina acidified by acetic acid, and spray drying of the resulting aquasol, the controlled heating serving to convert the ordinary alumina starting material to fibrous alumina monohydrate having the boehmite crystal lattice. The finished product contains approximately 83% by weight fibrous alumina monohydrate, has a specific surface area of 274 square meters per gram, a loose bulk density of 26 lb. per cu. ft., an absolute density (fibril) of 2.28 g. per cc., and a refractive index (fibril) of $1.580n_{25}{}^D$. The product is strongly cationic and disperses in water to such extent that the ultimate or individual fibers are dispersed as independent particles.

In 94.5 parts by weight of deionized or distilled water, disperse 0.003 part of polypropylene glycol (molecular weight 2000). Slowly introduce 5.0 parts of the fibrous alumina monohydrate and mix for 2-3 hours with shearing agitation. Add 0.5 part of nonionic surface active agent, e.g., a conventional commercial polyethylene-polypropylene glycol supplied by Wyandotte Chemicals Corp., Wyandotte, Michigan, under the trademark Pluronic L62, and continue agitation briefly. The resulting colloidal solution, containing 4.2% by weight fibrous alumina monohydrate and having a pH of about 4, is a thin, only very slightly thixotropic, pourable liquid which maintains its initial condition for storage periods of 12 months and longer.

The following example illustrates practice of the invention in the control of slimes in pulp and paper mill recirculating waters.

Example 2

The invention employed in an integrated groundwood sulfite pulp and paper newsprint mill where slime formation generally had become a serious problem and, in particular, the collection of pitch in various areas of the sulfite mill, the groundwood mill and the paper mill was so serious as to cause a high frequency of "breaks" and other attendant difficulties. An aqueous solution of fibrous alumina monohydrate, prepared in accordance with Example 1 and containing 4.2% by weight alumina monohydrate, was metered continuously into the recirculating water in both the sulfite mill and the groundwood mill at rates maintained in the range of from 0.5 lb. to 1.0 of the solution per ton of fiber contained in the water, the addition of the solution of fibrous alumina monohydrate being continued throughout operation of the mill.

Adequate control of all slimes was attained. Of the slimes developed in the mill before commencing treatment in accordance with this example, pitch represented the most serious problem. Following commencement of treatment with the aqueous dispersion of alumina monohydrate, significant decreases in pitch were noted in the sulfite mill, particularly at the knotter head box, the knotters and the refining screens; in the groundwood mill at the grinders end and at the groundwood deckers; and in the paper mill, at the mixing boxes, headers, head box, wires, flat boxes, felt suction boxes, press section doctor blades, felts, and squeeze rolls. Thus, before introduction of the alumina monohydrate, black pitch accumulated on the felt suction boxes at the rate of ⅜ inch in 6 hrs., and this accumulation decreased to less than ¹⁄₁₀₀ inch in 24 hrs. after introduction of the fibrous alumina monohydrate, so that a decrease in pitch accumulation in excess of 90% was accomplished. Similar results were noted in other portions of the mill.

Before application of the invention in accordance with this example, the mill employed a substantial quantity of polyphosphate as a detergent additive and dispersant in the wire cleaning spray of the paper mill. Once the fibrous alumina monohydrate had been introduced, the requirement for polyphosphate in the wire cleaning spray was completely eliminated. The cost of the polyphosphate previously employed in the wire cleaning spray exceeded the cost of the alumina monohydrate introduced to the entire integrated mill. Hence, the advantages of the invention were achieved without increasing the cost for additives. Further, and of particular significance, it was found that the frequency of paper "breaks" was materially reduced, as a result of elimination of pitch and other slimes, with an attendant saving in operating cost. It was also found that the method reduced clean-up time, particularly in the groundwood mill, and increased the life of the felts in the paper mill.

The following example illustrates the effect of the present invention in increasing the overall efficiency of paper mills.

Example 3

In a number of paper mills, all employing Fourdrinier machines, the invention was practiced by continuously introducing into the circulating water of the mill an aqueous colloidal solution of fibrous alumina monohydrate prepared in accordance with Example 1 and containing 4.2% by weight of the fibrous alumina monohydrate. Though the rates of addition varied with the requirements of the various mills, the proportion of the 4.2% alumina monohydrate colloidal solution employed was kept within the range of 0.1-10.0 lbs. of solution per ton of paper fiber in the water. Composite results, as to increase in operating machine-days and decrease in paper "breaks" over a definite time period, for all of the mills, was as follows:

|  | Before Introduction of Fibrous Alumina | After Introduction of Fibrous Alumina |
|---|---|---|
| Total operating machine-days | 278 | 352 |
| Total "wet breaks" | 368 | 304 |
| Total "dry breaks" | 82 | 56 |
| Total "breaks" per machine per day | 1.62 | 1.02 |

The method of the invention thus accomplished a decrease of approximately 34% in the "wet breaks" (occurring in that part of the mill from and including the wire through the press felts) and a decrease of approximately 45% in the "dry breaks" (occurring from and including the dryer to the reel where the paper is accumulated). Since each "break" causes an interruption, in operation of the machine, for from 5 to 10 minutes, and the loss per minute of production time can be as high as ninety dollars, it is obvious that the marked reduction in the frequency of "breaks," achieved by the present method, represents a sizeable saving.

It was also found that, for the group of mills in which the method was applied and over the time period involved, the number of draw roll cleanings required was reduced by approximately 37%, representing a further economy in operation and maintenance of the mills.

When the invention is practiced, as in Examples 2 and 3, to control slime in paper mill waters, it is found that the usual relatively high losses of pigments, fillers and the like are markedly reduced. This occurs because the fibrous alumina monohydrate increases the retention of pigments, fillers and the like on the paper fibers. The following example illustrates novel compositions in accordance with the invention which combine the slime control additive with the pigment, filler or the like, the alumina monohydrate and the pigment, etc., thus being introduced concurrently to the aqueous system.

Example 4

In a suitable motorized blender, 99.98 parts by weight titanium dioxide is uniformly combined with 0.02 parts by weight of the dry fibrous alumina monohydrate employed in Example 1. This composition is employed in the paper mill wherever titanium dioxide is to be used as a pigment and control of slimes is required. The dry, free-flowing composition is introduced at the beater, for example, so that the titanium dioxide is properly available and the alumina monohydrate becomes dispersed in the water. In addition to flocculating slime-formers containing anionic constituents, the alumina monohydrate tends to flocculate the titanium dioxide which would normally be lost in the recirculating water, the flocculated titanium dioxide being retained by the paper fiber and thus carried into the paper web. In effect, presence of the alumina monohydrate serves to retain more of the titanium dioxide in the paper web for each pass of the water through the wire.

When practicing the invention in accordance with this example, the alumina monohydrate can be blended with one or more of any of the conventional solid particulate paper pigments and fillers, especially including titanium dioxide, calcium carbonate, calcium sulfate, clays, and the like. The alumina monohydrate can amount to from 0.01% to 5.00% by weight of the composition.

The following example illustrates use of the invention in the control of slimes in swimming pool waters and the like.

*Example 5*

To the water contained in a pool equipped with a conventional filter, enough of the aqueous solution of Example 1 is added to provide 0.05–3.00 parts per million of the alumina monohydrate, based on the total water involved. Normal circulation of the pool water assures uniform dispersal of the alumina monohydrate throughout the system. The slime-formers are flocculated and the floc removed by the filter.

The same proportions as in the foregoing example are employed when treating stagnant pools, where the floc is removed by decanting, as over a weir, and settling.

When the alumina monohydrate is to be employed as a solution, an organic solvent compatible with the aqueous medium to be treated can be employed, the following example being typical as to the preparation of suitable non-aqueous solutions.

*Example 6*

Employing the dry product of Example 1, containing 4.2% by weight of the fibrous alumina monohydrate, 1.0 g. of the dry product is dispersed in 98 g. of ethylene glycol and 1 cc. of 5% nitric acid, by shearing agitation continued for 30 min. The resulting product is a stable colloidal solution of the alumina monohydrate in ethylene glycol.

I have found that, in some instances, it is desirable to employ the fibrous alumina monohydrate in conjunction with an active microbicide. This embodiment of the invention has the advantage of destroying small residual populations of microorganisms which might not be flocculated by the alumina monohydrate alone. In flocculating anionic material generally, the alumina monohydrate not only reduces the number of residual microorganisms to a point such that destruction thereof by the microbicide is more certain, but also eliminates those deposits which otherwise would result from the various slime-formers and tend to foster concentrations of microorganisms.

In this connection, the invention embraces compositions comprising both the fibrous alumina monohydrate and at least one active agent selected from the group consisting of active chlorine releasing compounds, oligodynamic heavy metal compounds, and oligodynamic metals in elemental form. As active chlorine releasing compounds, chloramine-T, chloramine-B, dichloroisocyanuric acid, trichloroisocyanuric acid, potassium dichloroisocyanurate, sodium dichloroisocyanurate, calcium hypochlorite, sodium hypochlorite and potassium hypochlorite may be employed. Oligodynamic metals which are suitable include silver, copper, tin, mercury, gold, platinum and palladium, and these can be employed in the form of the acetate, benzoate, carbonate, citrate, lactate, halids, nitrate or proteinate, or in elemental form. When the alumina monohydrate is employed in conjunction with an active chlorine releasing agent, the alumina monohydrate can constitute 0.01–5.00% by weight, and the chlorine releasing agent or agents 99.99–95.00% by weight, of the total composition, the composition being a free-flowing solid. When the alumina monohydrate is employed in conjunction with an oligodynamic metal or compound thereof, the alumina monohydrate and the oligodynamic metal or compound thereof are each employed in an amount in the range of 0.01–5.00% by weight and the balance of the composition is made up by one or more inert constituents. The following examples are illustrative.

*Example 7*

A dry, particulate composition suitable for treating swimming pool waters, stagnant ponds, and the like is prepared by uniformly blending 2.50 parts by weight of the dry fibrous alumina monohydrate of Example 1 with 97.50 parts by weight of potassium dichloroisocyanurate.

*Example 8*

A dry, particulate composition suitable for addition in the beater of a paper mill for the control of slime and the introduction of titanium dioxide is prepared by blending 1.00 part by weight of the dry alumina monohydrate of Example 1, 0.25 part by weight of silver acetate, and 98.75 parts by weight of titanium dioxide.

Though various particularly advantageous embodiments of the invention have been described for illustrative purposes, it will be understood that various changes and modifications can be made therein without departing from the scope of the invention as defined in the appended claims.

What is claimed is:
1. The method for at least minimizing the adverse effects in aqueous media of biological and chemical slime-forming materials containing anionic components, comprising
   uniformly dispersing in the aqueous medium a cationic colloidal alumina in fibrous macro-molecular form in which the macro-molecules are 100–1500 millimicrons in length, have a length-to-width ratio of at least 20:1, and are characterized by presence of a multiplicity of positive charges distributed along the length of the molecule,
   the quantity of said fibrous alumina employed amounting to 0.01–150 p.p.m., based on the aqueous medium,
   said alumina serving to flocculate said slime-forming materials without formation of sticky, gelatinous or agglomerated precipitates, and
   removing the resulting floc from the aqueous medium.
2. The method for at least minimizing the effects, in the recirculating waters of pulp and paper mills, of biological and chemical slime-forming materials containing anionic components, comprising
   continuously adding to the recirculating water, at a point prior to the introduction of the pulp, a relatively minute quantity of a cationic colloidal alumina monohydrate in fibrous macro-molecular form, the macro-molecules of which are 100–1500 millimicrons in length, have a length-to-width ratio of at least 20:1, and are characterized by the presence of a multiplicity of positive charges distributed along the length of the molecule,
   said alumina monohydrate being added at a rate of 0.01 to 150 parts per million, based on the recirculating water,
   said alumina monohydrate flocculating said slime-forming materials before introduction of the pulp, the resulting floc attaching itself to the pulp after the pulp is introduced so as to be removed from the water with the pulp fibers.
3. The method of claim 2 wherein
   said alumina monohydrate is employed in the form of an aqueous colloidal solution.
4. The method of claim 2 wherein
   said alumina monohydrate is employed in the form of a colloidal solution in a polar organic solvent.
5. The method of claim 2 wherein
   said alumina monohydrate is incorporated in a flocculatable particulate material selected from the group consisting of pigments and fillers for paper and the mixture is then introduced into the recirculating water.

6. The method of claim 5 wherein said particulate material is titanium dioxide.

References Cited by the Examiner

UNITED STATES PATENTS

| | | | |
|---|---|---|---|
| 2,915,475 | 12/1959 | Bugosh | 162—181 |
| 2,917,426 | 12/1959 | Bugosh | 162—181 |
| 3,031,418 | 4/1962 | Bugosh | 252—313 |
| 3,056,747 | 10/1962 | Arthur | 252—313 |

FOREIGN PATENTS 163,501  6/1955  Australia.

OTHER REFERENCES

Casey, "Pulp and Paper," 2nd ed., vol. II, 1960, Interscience Publishers, Inc., New York, N.Y., pp. 745 and 746.

DONALL H. SYLVESTER, *Primary Examiner.*

MORRIS O. WOLK, *Examiner.*